(12) United States Patent
Kopf et al.

(10) Patent No.: US 9,881,354 B2
(45) Date of Patent: Jan. 30, 2018

(54) IMAGE COMPLETION INCLUDING AUTOMATIC CROPPING

(75) Inventors: Johannes Peter Kopf, Bellevue, WA (US); Sing Bing Kang, Redmond, WA (US); Wolf Kienzle, Bellevue, WA (US); Steven M. Drucker, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 24 days.

(21) Appl. No.: 13/421,307

(22) Filed: Mar. 15, 2012

(65) Prior Publication Data

US 2013/0243320 A1    Sep. 19, 2013

(51) Int. Cl.
*G06K 9/00* (2006.01)
*G06T 3/40* (2006.01)
*G06T 5/00* (2006.01)

(52) U.S. Cl.
CPC ............ *G06T 3/4038* (2013.01); *G06T 5/005* (2013.01)

(58) Field of Classification Search
USPC .............. 382/276–308, 181–231, 168–172
See application file for complete search history.

(56) References Cited

U.S. PATENT DOCUMENTS

| | | | | |
|---|---|---|---|---|
| 5,546,475 A | * | 8/1996 | Bolle et al. | .................... 382/190 |
| 5,602,654 A | * | 2/1997 | Patti et al. | ..................... 358/461 |
| 5,689,584 A | * | 11/1997 | Kobayashi | ........... G06K 9/4647 |
| | | | | 382/190 |
| 5,692,065 A | * | 11/1997 | Prakash | .................. G06K 9/036 |
| | | | | 382/112 |
| 5,872,867 A | * | 2/1999 | Bergen | .................. G06T 11/001 |
| | | | | 348/571 |
| 5,940,524 A | * | 8/1999 | Murayama et al. | .......... 382/112 |
| 6,784,927 B1 | * | 8/2004 | Itokawa | ..................... 348/208.1 |
| 7,424,218 B2 | | 9/2008 | Baudisch et al. | |
| 2001/0028732 A1 | * | 10/2001 | Coulombe et al. | ........... 382/149 |
| 2003/0076414 A1 | * | 4/2003 | Sato et al. | ..................... 348/148 |
| 2003/0147564 A1 | * | 8/2003 | Lee | ....................... G06T 3/4007 |
| | | | | 382/300 |
| 2005/0179688 A1 | * | 8/2005 | Chernichenko et al. | ..... 345/427 |
| 2007/0025723 A1 | * | 2/2007 | Baudisch et al. | ............. 396/287 |
| 2007/0280554 A1 | * | 12/2007 | Chernichenko et al. | ..... 382/275 |
| 2008/0037904 A1 | * | 2/2008 | Hiramoto et al. | ............ 382/306 |

(Continued)

OTHER PUBLICATIONS

"Creating Panoramas—Using Photoshop Elements 3.0", Published on: 2005, Available at: http://mosaicdesignservices.com/webgraphics/tutorial/pe/PanoramasPE30.pdf.

(Continued)

*Primary Examiner* — Alex Liew (57) ABSTRACT

Described is a technology by which an image such as a stitched panorama is automatically cropped based upon predicted quality data with respect to filling missing pixels. The image may be completed, including by completing only those missing pixels that remain after cropping. Predicting quality data may be based on using restricted search spaces corresponding to the missing pixels. The crop is computed based upon the quality data, in which the crop is biased towards including original pixels and excluding predicted low quality pixels. Missing pixels are completed by using restricted search spaces to find replacement values for the missing pixels, and may use histogram matching for texture synthesis.

20 Claims, 5 Drawing Sheets

(56) References Cited

U.S. PATENT DOCUMENTS

| | | |
|---|---|---|
| 2008/0111831 A1 | 5/2008 | Son et al. |
| 2009/0153811 A1* | 6/2009 | Braiman et al. ............. 353/121 |
| 2010/0046843 A1* | 2/2010 | Ma ..................... G06K 9/00657 |
| | | 382/224 |
| 2010/0232654 A1* | 9/2010 | Rahmes ............. G06K 9/00604 |
| | | 382/117 |

OTHER PUBLICATIONS

Metcalf, Thomas R., "Stitch Panorama", Published on: Jun. 7, 2005, Available at: http://stitchpanoranna.sourceforge.net/stitch_panorama.pdf.

"Stitching a Panorama in Adobe Photoshop CS4", Retrieved on: Oct. 12, 2011, Available at: http://www.adobepress.com/articles/article.asp?p=1250483.

"Panoramic Image Projections", Retrieved on: Oct. 12, 2011, Available at: http://www.cambridgeincolour.com/tutorials/image-projections.htm.

"Photoshop CS5 New Features—Content-Aware Fill", Retrieved on: Oct. 12, 2011, Available at: http://www.photoshopessentials.com/photo-editing/cs5/new-features/fill-content-aware/page-2.php.

* cited by examiner

IMAGE COMPLETION INCLUDING AUTOMATIC CROPPING

BACKGROUND

Image completion or inpainting (hereinafter "image completion" for brevity) is a popular image editing tool for object removal and replacement or digital photograph restoration. In most approaches, image completion is used to fill holes after unwanted objects are removed. Image completion also may be used to extend an image beyond its original boundaries.

For example, casually shot panoramas often have irregular boundaries. Most users, however, prefer images with rectangular boundaries. One trivial solution implemented by conventional stitching software is to crop the image to the largest box that is fully contained within the panorama, however, this simple solution often removes large parts of the image. An alternative is to apply any existing completion algorithm to fill the missing regions of the panorama bounding box.

However, existing image completion algorithms often fail. One type of failure typically appears as an inability to synthesize some textures well, e.g., noticeable as blurring and/or mismatching in the image. Another type of failure is when image completion provides results that are semantically implausible; (e.g., the completed sky in a scenic image appears with some non-sky scenery, such as the ground, floating in the air above the horizon). Any image completion technology that avoids such failures to a greater extent is desirable.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which an image is automatically cropped based upon predicted success of filling missing pixels, with at least some of the missing pixels completed. In one aspect, quality data for missing pixels associated with an image containing original pixels is predicted, in which the prediction is based at least in part on using restricted search spaces corresponding to the missing pixels. A crop is computed based upon the quality data, in which the crop is biased towards including original pixels and excluding predicted low quality pixels. Missing pixels are completed by using restricted search spaces to find replacement values for the missing pixels.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards image completion based upon histogram matching or the like to improve texture synthesis, and source location restriction to avoid semantically implausible results. Further, source location restriction facilitates performance prediction by allowing the correlation of output quality against features of the possible regions used for synthesis. Prediction in turn facilitates automatic cropping.

In one implementation, the technology described herein first crops and then completes stitched panoramas. A predictive mechanism in conjunction with a cropping mechanism computes an optimal crop rectangle (or other desired shape) before performing the completion, which tends to save potentially significant amounts of computation. In general, the optimized crop includes as much of the original panorama as possible while avoiding regions that are predicted to be less successfully filled in. The automatic cropping image completion technology described herein thus provides high quality results along with the ability to predict performance.

It should be understood that any of the examples herein are non-limiting. For instance, example algorithms are described herein, however alternative algorithms may be used. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing and image processing in general.

Figure 1:
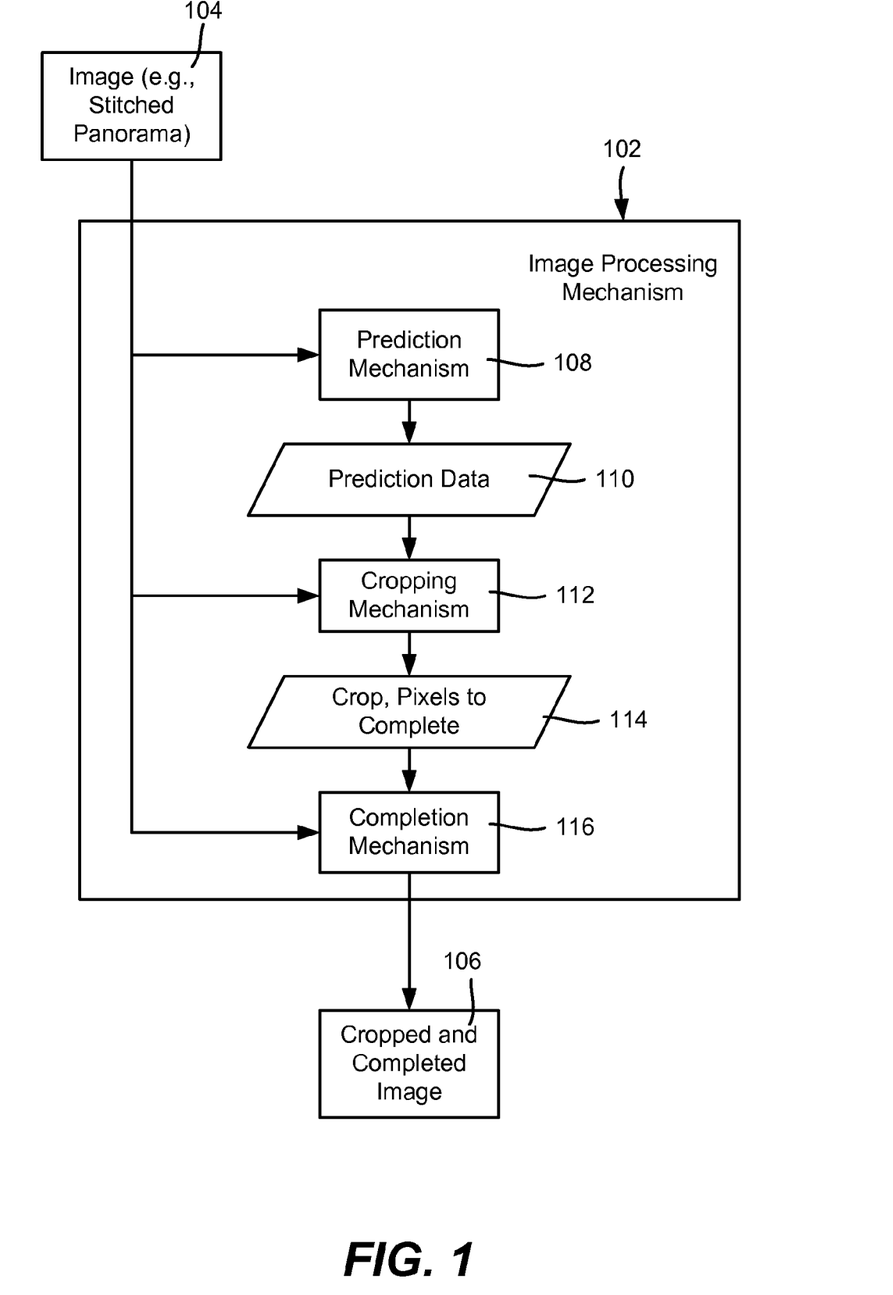
FIG. 1 is a block diagram showing example components that process an image including with automatic cropping and completion according to one or more example embodiments described herein.

FIG. 1 is a block diagram showing example components of one implementation of an image processing mechanism 102 configured to process an image 104 in need of completion (having unknown pixels) into a completed and cropped image 106. An example of such an image 104 is a stitched panorama.

In general, the image 104 is processed by a prediction mechanism 108 (comprising a prediction function) that predicts whether each unknown pixel that is able to be completed is likely to be completed successfully, that is with a predicted quality above a configurable success threshold. More particularly, as will be understood, the technology described herein includes color histogram matching to improve texture synthesis, and restriction of patch source locations. Color histogram matching to improve texture synthesis and restriction of patch source locations introduce a strong bias toward continuing image content near the boundary into the missing region. This facilitates the ability to predict algorithm performance before the completion is actually carried out.

The prediction mechanism may be trained with user-labeled training data, which in general may be used to estimate a soft threshold of the prediction function that separates what is perceptually acceptable to actual users and what is not. As described herein, image statistics that are more global (with respect to other techniques) are used for mapping, which results in more desirably synthesized textures. Further, the results are predictable by enforcing continuation of image content near the boundary into the unknown region. To this end, in one implementation, each pixel in the unknown regions is a function of the closest parts of the known region. This dependency finds the association between the perceived quality of the results (user-labeled training data) and the low-level features of the closest regions. Example low-level features include color, edge density, edge orientation, contour length, and/or region size. The result comprises the prediction function that maps each pixel in the unknown regions to a measure of predicted output quality, as represented by the prediction data 110. Further aspects of prediction are described below.

Turning to one implementation of an image completion algorithm/mechanism 116, in general, one such algorithm minimizes a "texture energy" term that measures the extent to which the synthesized region deviates from the known region over a set of overlapping local patches. A basic form of an energy function is $$E = \sum_{i \in \Omega} \|p_i - q_i\|, \tag{1}$$

where $\Omega$ is the set of center pixels of the patches (e.g., 5×5) patches that are completely contained within the image domain and overlap at least one unknown pixel. Note that "image domain" refers to the minimum bounding box containing the panorama. The term $p_i$ denotes a (destination) patch centered at pixel i, and $q_i$ is a (source) patch in the known region K that is close in appearance to $p_i$.

The energy may be minimized in an iterative fashion, alternating between minimizing with respect to set of $p_i$ or $q_i$ while the other set is fixed. Minimizing the $q_i$ assignments (in a search phase) is based on finding the closest appearing known patch for each synthesized patch $p_i$. This task is computationally expensive, and may use approximative search techniques to keep the run time reasonable; (an example is described in "Patchmatch: a randomized correspondence algorithm for structural image editing," BARNES, C., SHECHTMAN, E., FINKELSTEIN, A., AND GOLDMAN, D. B. (2009), ACM Trans. on Graphics (Proceedings of Siggraph) 28, 24:1-24:11).

In one implementation, minimizing $p_i$ (in an optimization phase) may be performed via an averaging of the overlapping $q_i$ assignments; results may be computed in a coarse-to-fine fashion using an image pyramid. This algorithm may become stuck in bad local minima, and is sensitive to its initialization. More particularly, without good initialization, the algorithm tends to generate results that suffer from quality issues such as blurry textures and semantic issues.

Equation (1) exclusively measures the local appearance of the result by enforcing similarity of small patches. It does not attempt to match any global image characteristics. For that reason, the results may be locally good but globally questionable, resulting in problems such as blurry results, because overlapping smooth patches match well and result in a very low energy configuration. Instead of a global target histogram (because images are not locally stationary but are composed of spatially-varying textures), the technology described herein keeps track of and matches histograms within local windows around each pixel. For example, one implementation uses 16-bin histograms per channel, with a window size of 21×21 pixels.

To match histograms with target patches, the energy function may be augmented as:

$$E = \sum_{i \in \Omega} \|p_i - q_i\| + \lambda \|h_i - \tilde{h}_i\| \tag{2}$$

where $h_i$ denotes the histogram around pixel i and $\tilde{h}_i$ denotes the desired target histogram. To extend textures near the boundary into the unknown region, the target histogram for a pixel is set to the ("source") histogram around the nearest boundary pixel. Initially the process computes the source and target histograms in a single scanline sweep over the image, similar to a moving average filter. When computing target histograms, the process accounts for pixels only inside the known area.

Throughout the optimization the histograms are tracked by updating any affected histograms whenever a change is made to a pixel. This involves an increment and decrement operation for the 21×21 overlapping histogram windows, which does not significantly affect the overall performance of the algorithm, but has memory limitations for very large panoramas. Note that the histogram matching is most effective and needed most at the lowest levels of the multi-resolution pyramid; at coarser levels, histogram matching significantly enhances the algorithm's ability to generate rich (non-blurry) textures, while at finer scales, the textural details have already been established and histogram matching is less needed. Therefore, one implementation disables histogram matching for any resolution level that exceeds half a megapixel, whereby the memory consumption is bound to only a few megabytes.

Histogram matching may be enforced using weighted averaging in the optimization phase. The new color of a pixel i is given by:

$$\frac{1}{k_i} \sum_{k \in N(i)} w_k^i q_k^i, \tag{3}$$

where $q_k^i$ is the color of patch $q_k$ where it overlaps pixel i, $w_k^i$ are weights defined below, and $k_i$ is a normalizing factor, e.g., the sum of the weights. N(i) is the neighborhood of all pixels whose surrounding patches overlap pixel i, e.g. If 5×5 patches are used then this neighborhood contains 25 pixels. The weights $w_k^i$ penalize color assignments that deviate from the target histogram:

$$w_k^i = \frac{1}{1 + \sum_{c \in \{R,G,B\}} \max(0, h^c(q_k^i) - \tilde{h}^c(q_k^i))}. \tag{4}$$

The sum in the denominator is over the three color channels; $h_c(q_k^i)$ denotes the value of the histogram bin corresponding to the value of $q_k^i$.

Another issue with the basic energy equation (Equation (1)) is that the locations of patches $q_i$ are unrestricted. As a result, whatever patch is ultimately used for completion is generally unknown, making the algorithm unpredictable. Such a virtually complete freedom on synthesis often leads to semantically implausible results.

Figure 2:
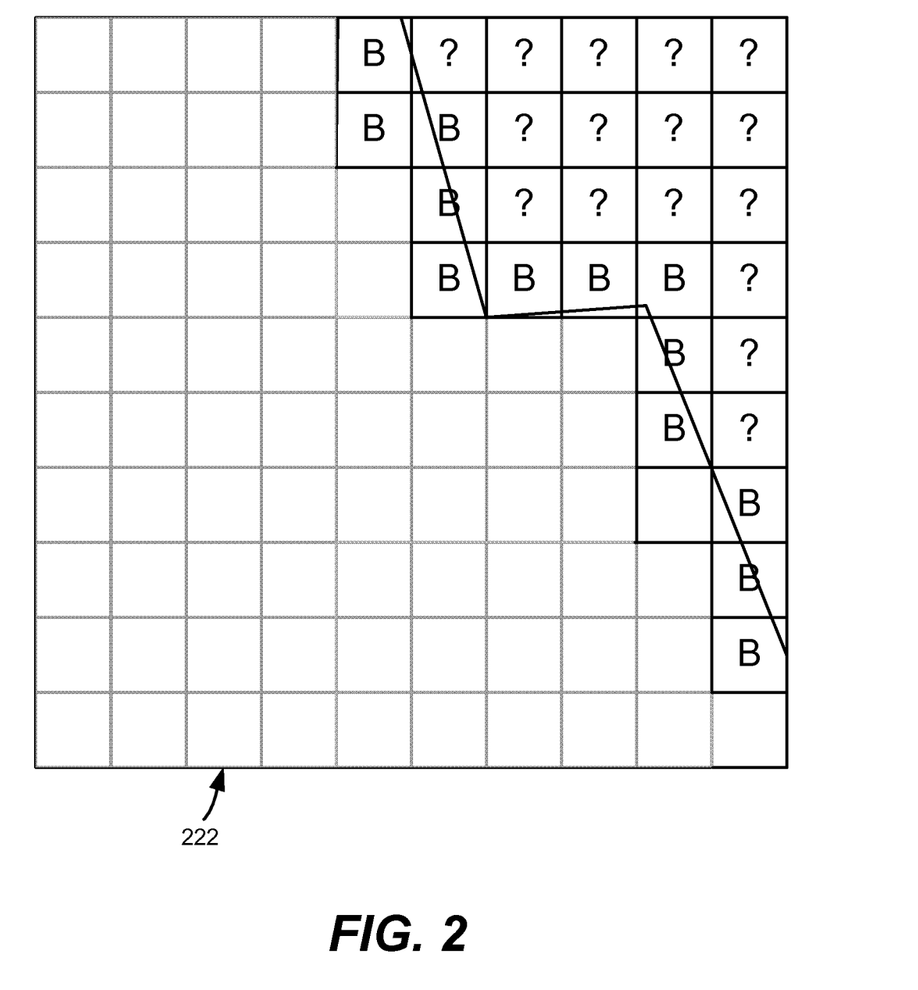
FIGS. 2 and 3 comprises representations of determining a restricted search space for use in processing an image according to one example embodiment described herein
Figure 3:
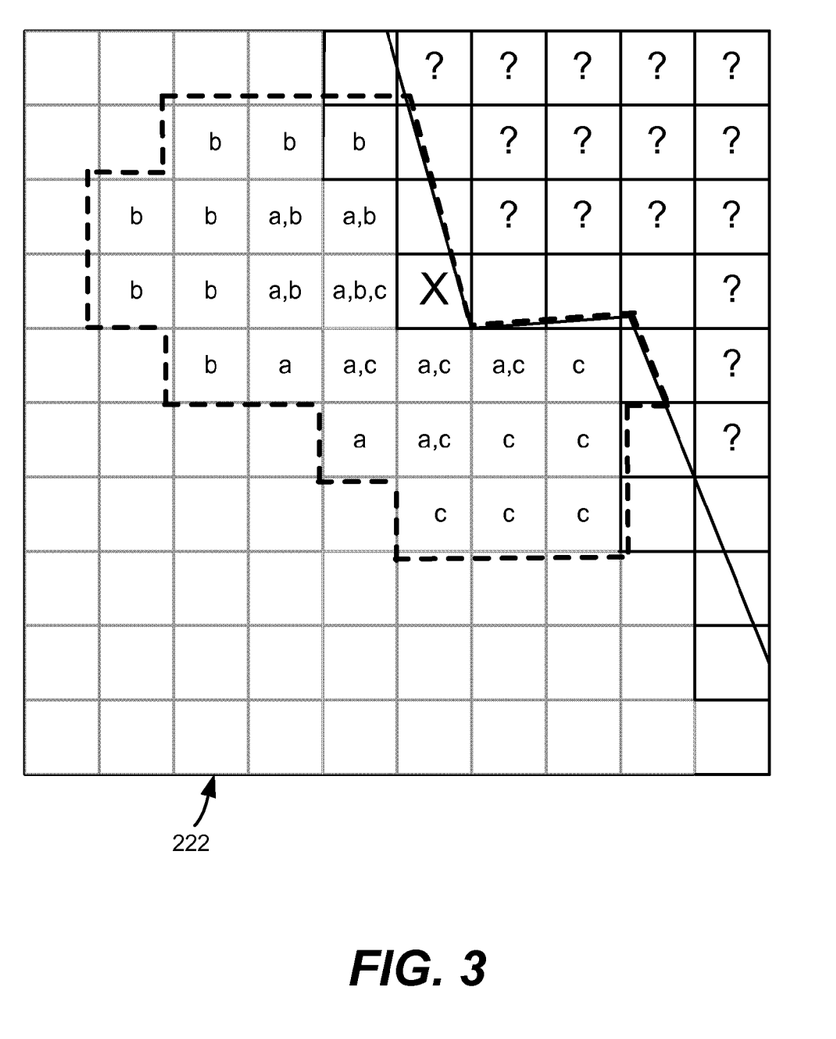

A solution described herein is based upon a constrained source location heuristic that restricts the source location. To this end, the image is partitioned into non-overlapping tiles, e.g., with each tile $t_i$ being 16×16 pixels, as generally represented in FIGS. 2 and 3, which illustrate computation of a restricted search space $R_i$. In FIG. 2, a panorama 222 is partitioned into square tiles, with the top right area corresponding to tiles with question marks ("?") representing the unknown region; boundary tiles are labeled with a "B" while regular tiles corresponding to known pixels are not labeled. The jagged line represents the boundary between known and unknown pixels. A boundary tile $t_i^b$ is a tile that touches or overlaps with an unknown region. For each $t_i^b$, one implementation of a constrained source location process finds the neighboring tiles that are within a certain threshold of a weighted sum of the Manhattan distance, with the weight between a pair of tiles computed as EarthMover's Distance between their histograms. The segment comprising these tiles, which includes $t_i^b$, is denoted as $S_i$. Note that the threshold may be automatically adjusted to ensure that $S_i$ has a certain minimum size.

The process also finds the other boundary tiles within close proximity to $t_i^b$, (in one example implementation, within a 7×7 tile neighborhood, however a 3×3 neighborhood will be used later in this example, with reference to FIG. 3). The union of the segments associated with these boundary tiles (including $t_i^b$) is referred to as the restricted search space $R_i$ associated with $t_i^b$.

FIG. 3 illustrates an example construction of the restricted search space $R_i$. for a given example boundary tile (indicated by the letter "X" within that particular boundary tile). The segment $S_i$ for this tile is represented by any tile containing an "a" as well as the known part of the boundary tile above the X tile (not labeled). For purposes of simplicity, the neighborhood for inclusion is 3×3 in this example, whereby the other boundary tiles denoted by "b" and "c" (as well as known parts of some of the boundary tiles, not labeled) are neighbors of the "X"-denoted tile. Thus, the segments are identifiable by containing an "a" "b" and/or "c" character, plus other parts that are not labeled, but will become apparent from the union; that is, the union of the three segments yields the restricted search space $R_i$, which in FIG. 3 is (approximately) outlined with the dashed black line.

Thus, if for example $t_i^b$ is the closest boundary tile to a given pixel i in the unknown region, in one heuristic, the permissible locations of candidate patches $q_i$ to $R_i$ are restricted. In other words, the algorithm forces to continue the image content near boundaries generally radially into the unknown region. As a consequence of knowing the pixel sources, the quality of completion is also made more predictable.

In general, completion quality tends to degrade progressively from the original image boundary, and completion quality tends to be lower in regions that contain more variation. Thus, in one implementation, the per-pixel quality estimate may be based on a term D that captures the distance to the original image boundary, and term G that captures the sum of gradient magnitudes of the nearby original image pixels. The quality measure E can be computed as a linear combination: $E=\lambda_1 D+\lambda_2 G$. The term D can be computed using a distance transform or a grassfire transform. The term E can be computed by first computing the sum of gradient magnitudes in a square window around every boundary pixel of the original image, and then diffusing that value inside the out-of-bounds regions using anisotropic diffusion.

In an alternative implementation, a prediction function may be generated (learned) by processing labeled training data that provides a measure of perceptual quality. For each pixel in unknown region, the set of segments that determine the restricted search space $R_i$ is deterministically found. The correlation between the quality label and feature vector for $R_i$ is found, e.g., let $R_i=\{S_j, j=1, \ldots, n_j\}$, with $n_j$ being the number of segments $S_j$'s that make up $R_i$. One suitable feature vector for $S_j$ includes color histograms (separate for R, G, B), edge density (percentage of pixels that are edge pixels), an edge orientation histogram, and histograms of contour and straight line lengths. Each histogram may be characterized by its entropy, mean, and standard deviation. Let this feature vector be $u_j$ and the size of $S_j$ in pixels be $a_j$. The feature vector for $R_j$ may be computed as:

$$v_i = \begin{pmatrix} \Sigma_j a_j u_j / \Sigma_j a_j \\ x_i \\ y_i \\ d_i \\ b_i \end{pmatrix}, \quad (5)$$

where $x_i$, $y_i$ are the image coordinates of the unknown pixel (normalized so that each ranges between 0 and 1) and $d_i$ is its distance to the boundary of the nearest known region; $b_i$ is the size of $R_i$, which is typically smaller than $\Sigma_j a_j$.

Let the label at pixel i be $t_i$ ("good"=1 or "bad"=−1). The learning constructs a function $f(v_i)$ that predicts the unknown label from a feature vector $v_i$. A standard learning algorithm for binary classification may be used to combine the feature vector into a scalar quality prediction. One such prediction function has the form:

$$f(v_i) = \sum_{k=1}^{m} h_k(v_i), \quad (6)$$

which is a sum of m regression stumps $$h_k(v_i) = \begin{cases} l_k & \text{if } v_i^{e_k} > t_k \\ r_k & \text{otherwise} \end{cases}, \quad (7)$$

where $v_i^{e_k}$ denotes the $e_k$-th element of the feature vector $v_i$. The learning algorithm determines the model parameters $e_k$, $t_k$, $l_k$, and $r_k$ by minimizing the energy:

$$E(f) = \sum_{i \in T} \exp(-t_i f(v_i)), \quad (8)$$

which penalizes positive values of f on "bad" examples and negative values on "good" examples; T is the training set manually labeled pixels.

The number of regression stumps m is a design parameter of the learning algorithm. This may be determined empirically by cross-validation, e.g., the training data may be randomly split into five validation folds, and then for each fold, by learning a prediction function using the data from the remaining four training folds. The average prediction performance on the five validation folds is an estimate of the generalization performance of the model. Repeating the process determined that the performance increased until about m=32, and then leveled off.

As described herein, the prediction mechanism 108 is used to compute the prediction data 110 representing the predicted quality of each of the unknown pixels. A cropping mechanism 112 uses the predicted data to compute the crop so as to generally contain as much of the original panorama as possible while avoiding areas of predicted lower quality. The crop and the pixels to complete (block 114) are thus computed, and processed by a completion mechanism 116 to provide the resultant image 106. Note that if cropping is performed before performing image completion (as in the example implementation of FIG. 1), the amount of computational savings is potentially significant as only unfilled pixels in the crop need to be completed.

In one aspect, for a rectangle, the cropping rectangle is initialized so as to contain only the original pixels. Thereafter, the cropping mechanism successively cuts off rows and columns at the left, right, top, bottom edges as long as the sum of energy in each row/column is above some threshold.

More particularly, the cropping mechanism 112 operates to automatically find the desired crop rectangle in this example (or other shape), and attempts to include as many of the known pixels as possible, and avoid unknown pixels that have been predicted as being low quality. To this end, an energy function may be used:

$$E^{crop}(C) = \sum_{i \in C} \varphi(i) + \lambda |\bar{C} \cap K| \quad (9)$$

where C represents the crop rectangle and $\bar{C}=\Omega-C$; $\Omega$ is the entire image domain (smallest bounding region containing the panorama) and K is the known region.

The first term in Equation (9) penalizes including predicted low quality pixels in the crop. Because this prediction function is not bound or normalized in any way, the function $$\varphi(i)=\max(0,(f(v_i)-\tau)/\Delta) \quad (10)$$

is defined to compute a per-pixel energy value. The values of $\tau$ (quality threshold) and $\Delta$ (quality range) may be set empirically, such as from user-provided data, e.g., one suitable value of $\tau=0.87$, and one suitable value of $\Delta=0.11$. The max operation clamps the energy such that any pixel that is considered a statistical middle ground or better is not penalized.

The second term in Equation (9) penalizes excluding known pixels from the crop rectangle. The factor $\lambda$ balances between setting $\lambda$ low, which leads to more aggressive crops because including bad pixels is more heavily penalized, or setting $\lambda$ high while a high yields a larger crop at the expense of including some potentially low-quality areas. One suitable value of $\lambda=1.3$.

In one implementation, a local minimizer of Equation (9) is found using a simple descent technique, namely that in each iteration, one of the four sides of the rectangle is changed by plus or minus one pixel, but only if doing so lowers the energy. To avoid bad local minima, some number of (e.g., 100) random rectangles may be used to start, keeping the configuration that yields the lowest energy. The non-convexity of Equation (9) over the (discrete) domain of valid crop rectangles is typically benign in that many iterations may be performed before the energy cannot be lowered any further. In practice, the optimization runs very fast.

Figure 4:
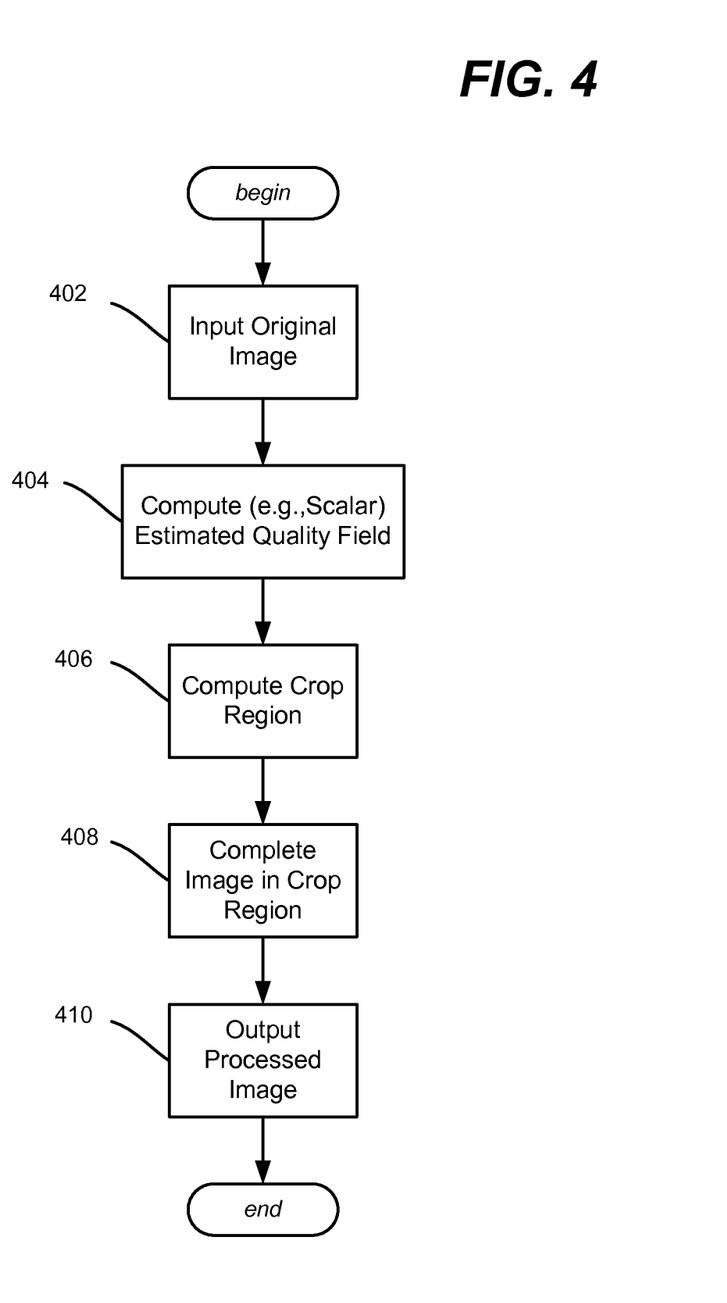
FIG. 4 is a flow diagram representing example steps for processing an image including with automatic cropping and completion according to one or more example embodiments described herein.

FIG. 4 summarizes various concepts related to the image processing technology described herein, beginning at step 402 where the original image to be processed is input into the system. As described above, step 404 estimates the quality of the completion for every pixel, so that cropping is determined at step 406 by penalizing inclusion of "low-quality" pixels more than others. In this way, the crop rectangle/shape is determined before the completion mechanism completes the pixels at step 408. This saves a large amount of computation by only completing pixels that will end up in the final result (output at step 410).

Note that while rectangular crops were generally described herein, non-rectangular crops (e.g., arbitrary shapes such as hearts, discs, and the like) may be accomplished. Such shapes also may be globally transformed (e.g., rotated or stretched) or parameterized in other ways that are specific to the shapes (e.g., curvature of the lobes of the heart shape). To this end, as the desired shape and/or transformation are known in advance, the cropping operates to determine whether to keep partial lines of pixels.

In addition, the technology is able to create custom frames and/or place graphical elements (e.g., a floral design) over holes (blank regions) that are difficult to automatically fill. For example, instead of removing a set of one lines with predicted low quality pixels during cropping (or after completion by maintaining at least some crop-related data), the line or lines may be replaced by (or augmented with) pixels that when combined form a border that frame the cropped image. The border may be anything from a solid color to an elaborate design pattern, and replacement/augmentation may be done as sets of many pixels rather than one pixel at a time. Such a border may be user selectable.

As can be seen, there is provided a technology for automatically cropping completed images by adapting the shape based on a prediction of how well holes (blank regions) can be filled or inpainted. To estimate the quality of a completion result before computing it, a prediction function may be learned, and/or the shape and local amount of gradient may be used.

Example Operating Environment

Figure 5:
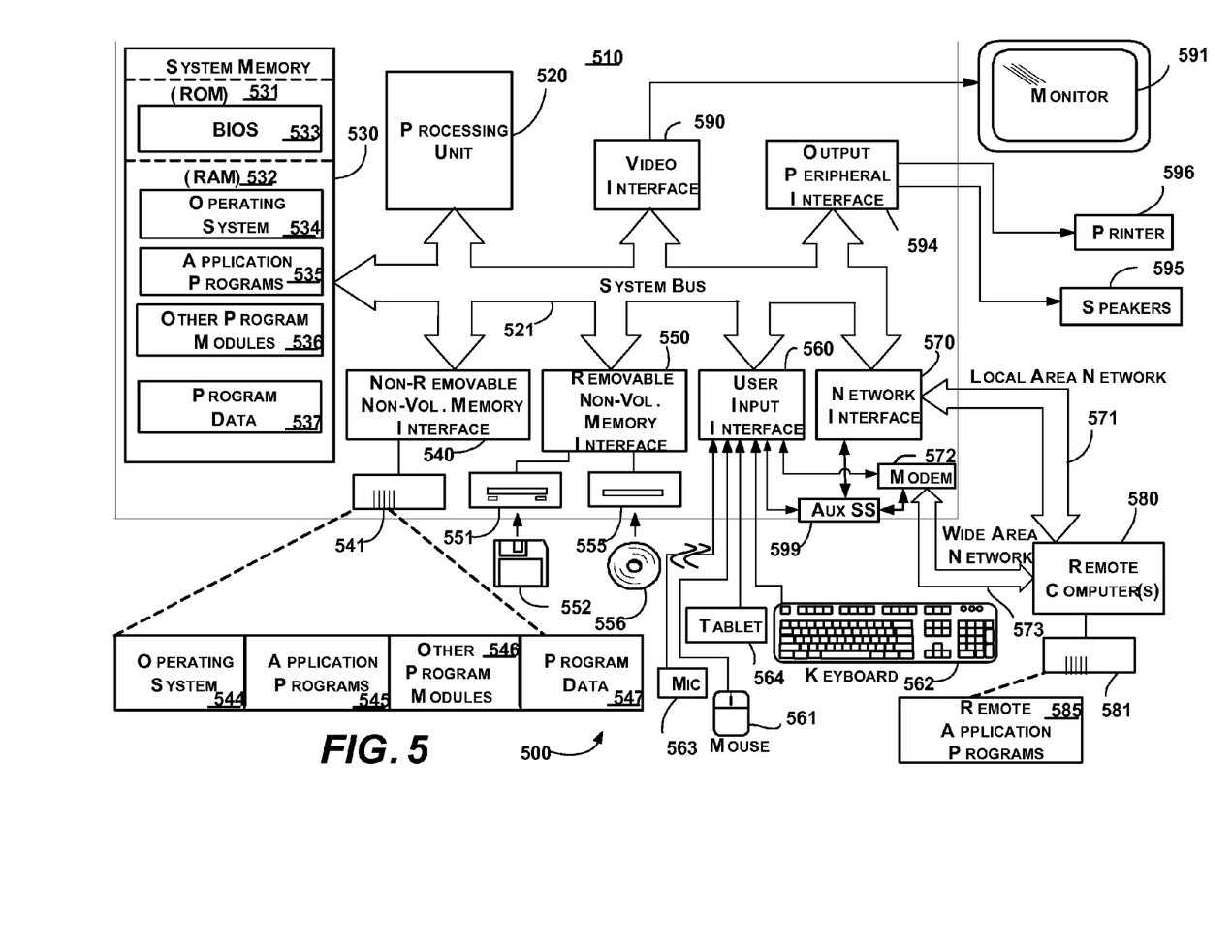
FIG. 5 is a block diagram representing an example computing environment into which aspects of the subject matter described herein may be incorporated.

FIG. 5 illustrates an example of a suitable computing and networking environment 500 into which the examples and implementations of any of FIGS. 1-4 may be implemented, for example. The computing system environment 500 is only one example of a suitable computing environment and is not intended to suggest any limitation as to the scope of use or functionality of the invention. Neither should the computing environment 500 be interpreted as having any dependency or requirement relating to any one or combination of components illustrated in the example operating environment 500.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 5, an example system for implementing various aspects of the invention may include a general purpose computing device in the form of a computer 510. Components of the computer 510 may include, but are not limited to, a processing unit 520, a system memory 530, and a system bus 521 that couples various system components including the system memory to the processing unit 520. The system bus 521 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 510 typically includes a variety of computer-readable media. Computer-readable media can be any available media that can be accessed by the computer 510 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 510. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media.

The system memory 530 includes computer storage media in the form of volatile and/or nonvolatile memory such as read only memory (ROM) 531 and random access memory (RAM) 532. A basic input/output system 533 (BIOS), containing the basic routines that help to transfer information between elements within computer 510, such as during start-up, is typically stored in ROM 531. RAM 532 typically contains data and/or program modules that are immediately accessible to and/or presently being operated on by processing unit 520. By way of example, and not limitation, FIG. 5 illustrates operating system 534, application programs 535, other program modules 536 and program data 537.

The computer 510 may also include other removable/non-removable, volatile/nonvolatile computer storage media. By way of example only, FIG. 5 illustrates a hard disk drive 541 that reads from or writes to non-removable, nonvolatile magnetic media, a magnetic disk drive 551 that reads from or writes to a removable, nonvolatile magnetic disk 552, and an optical disk drive 555 that reads from or writes to a removable, nonvolatile optical disk 556 such as a CD ROM or other optical media. Other removable/non-removable, volatile/nonvolatile computer storage media that can be used in the example operating environment include, but are not limited to, magnetic tape cassettes, flash memory cards, digital versatile disks, digital video tape, solid state RAM, solid state ROM, and the like. The hard disk drive 541 is typically connected to the system bus 521 through a non-removable memory interface such as interface 540, and magnetic disk drive 551 and optical disk drive 555 are typically connected to the system bus 521 by a removable memory interface, such as interface 550.

The drives and their associated computer storage media, described above and illustrated in FIG. 5, provide storage of computer-readable instructions, data structures, program modules and other data for the computer 510. In FIG. 5, for example, hard disk drive 541 is illustrated as storing operating system 544, application programs 545, other program modules 546 and program data 547. Note that these components can either be the same as or different from operating system 534, application programs 535, other program modules 536, and program data 537. Operating system 544, application programs 545, other program modules 546, and program data 547 are given different numbers herein to illustrate that, at a minimum, they are different copies. A user may enter commands and information into the computer 510 through input devices such as a tablet, or electronic digitizer, 564, a microphone 563, a keyboard 562 and pointing device 561, commonly referred to as mouse, trackball or touch pad. Other input devices not shown in FIG. 5 may include a joystick, game pad, satellite dish, scanner, or the like. These and other input devices are often connected to the processing unit 520 through a user input interface 560 that is coupled to the system bus, but may be connected by other interface and bus structures, such as a parallel port, game port or a universal serial bus (USB). A monitor 591 or other type of display device is also connected to the system bus 521 via an interface, such as a video interface 590. The monitor 591 may also be integrated with a touch-screen panel or the like. Note that the monitor and/or touch screen panel can be physically coupled to a housing in which the computing device 510 is incorporated, such as in a tablet-type personal computer. In addition, computers such as the computing device 510 may also include other peripheral output devices such as speakers 595 and printer 596, which may be connected through an output peripheral interface 594 or the like.

The computer 510 may operate in a networked environment using logical connections to one or more remote computers, such as a remote computer 580. The remote computer 580 may be a personal computer, a server, a router, a network PC, a peer device or other common network node, and typically includes many or all of the elements described above relative to the computer 510, although only a memory storage device 581 has been illustrated in FIG. 5. The logical connections depicted in FIG. 5 include one or more local area networks (LAN) 571 and one or more wide area networks (WAN) 573, but may also include other networks. Such networking environments are commonplace in offices, enterprise-wide computer networks, intranets and the Internet.

When used in a LAN networking environment, the computer 510 is connected to the LAN 571 through a network interface or adapter 570. When used in a WAN networking environment, the computer 510 typically includes a modem 572 or other means for establishing communications over the WAN 573, such as the Internet. The modem 572, which may be internal or external, may be connected to the system bus 521 via the user input interface 560 or other appropriate mechanism. A wireless networking component 574 such as comprising an interface and antenna may be coupled through a suitable device such as an access point or peer computer to a WAN or LAN. In a networked environment, program modules depicted relative to the computer 510, or portions thereof, may be stored in the remote memory storage device. By way of example, and not limitation, FIG. 5 illustrates remote application programs 585 as residing on memory device 581. It may be appreciated that the network connections shown are examples and other means of establishing a communications link between the computers may be used.

An auxiliary subsystem 599 (e.g., for auxiliary display of content) may be connected via the user interface 560 to allow data such as program content, system status and event notifications to be provided to the user, even if the main portions of the computer system are in a low power state. The auxiliary subsystem 599 may be connected to the modem 572 and/or network interface 570 to allow communication between these systems while the main processing unit 520 is in a low power state.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A method comprising:
   determining, using a prediction function, a quality of at least one missing region relative to a quality threshold prior to filling in the at least one missing region with known pixels from one or more other regions of an image, the at least one missing region comprising unknown pixels;
   subsequently computing a crop of the image based upon the determined quality of the at least one missing region by excluding one or more of the unknown pixels in the at least one missing region that are below the quality threshold and including one or more of the unknown pixels in the at least one missing region that are above the quality threshold; and
   upon computing the crop, filling in the one or more of the unknown pixels in the at least one missing region that are above the quality threshold within the crop with one or more of the known pixels of the image.

2. The method of claim 1 wherein the determining includes determining candidate patches comprising known pixels that are useable in completing a missing region, including restricting a source location for the candidate patches based upon texture features.

3. The method of claim 2 further comprising using histogram matching for texture synthesis.

4. The method of claim 1 wherein the determining includes computing a distance to each of the unknown pixels from a corresponding source location.

5. The method of claim 1 wherein computing the crop comprises using an energy function that penalizes an inclusion of low quality pixels and penalizes an exclusion of original pixels.

6. The method of claim 5 further comprising:
   computing a per-pixel energy; and
   determining whether to adjust a portion of the crop based upon the combined energy of pixels corresponding to the portion of the crop.

7. The method of claim 1 further comprising, replacing at least some low quality regions with part of a decorative frame around at least part of the crop.

8. The method of claim 1 further comprising, training a prediction mechanism that predicts a quality of the unknown pixels.

9. The method of claim 1 wherein determining that the at least one missing region is a low quality region comprises inputting a feature vector into a trained prediction mechanism.

10. The method of claim 1 wherein filling in the one or more of the unknown pixels comprises finding a closest appearing known patch.

11. A system comprising:
    a prediction mechanism that:
       determines quality data for missing pixels associated with an image using a prediction function, the determined quality data comprising at least one missing region of the image comprising sets of unknown pixels; and
       determine a quality of the at least one missing region, based on the prediction function, relative to a quality threshold prior to filling in the at least one missing region with known pixels from one or more other regions of the image; and
    a cropping mechanism that:
       processes the quality data to generate a crop of the image based upon the determined quality of the at least one missing region by excluding one or more unknown pixels in the sets of the unknown pixels in the at least one missing region that are below the quality threshold and including one or more of the unknown pixels in the at least one missing region that are above the quality threshold; and
       upon generating the crop, fills the unknown pixels in the at least one missing region that are above the quality threshold within the crop with the known pixels of the image based on processing the quality data.

12. The system of claim 11 wherein the prediction mechanism outputs the determined quality data for a pixel by inputting a feature vector corresponding to a restricted search space that is based at least in part on a location of the pixel.

13. The system of claim 12 wherein the feature vector is based at least in part on one or more color-related histograms, edge density data, an edge orientation-related histogram, a contour-related histogram or a straight line length-related histogram, or any combination of one or more color-related histograms, edge density data, an edge orientation-related histogram, a contour-related histogram or a straight line length-related histogram.

14. The system of claim 13 wherein at least one of the histograms corresponds to entropy data, mean data or standard deviation data, or any combination of entropy data, mean data or standard deviation data.

15. The system of claim 11 further comprising a completion mechanism that uses histogram matching for texture synthesis, in which the histograms correspond to a restricted search space computed for the missing pixels.

16. One or more computer-readable storage devices having computer-executable instructions for processing an image to complete missing regions, which when executed by one or more processors, perform operations comprising:
  determining a quality of a region based on the region including pixels of the image and missing pixels of the image prior to filling in the missing pixels with known pixels from one or more other regions of the image; and
  based on the determined quality of the region, generating a crop of the image by excluding one or more missing pixels in the region that are below a quality threshold and including one or more of the missing pixels in the region that are above the quality threshold; and
  upon generating the crop, filling the missing pixels in the region that are above the quality threshold within the crop with the pixels within the crop or the known pixels based on the determining.

17. The one or more computer-readable storage devices of claim 16 wherein the determining is based upon restricting a source location for each filled-in pixel based upon texture features.

18. The one or more computer-readable storage devices of claim 16 having further computer-executable instructions that when executed by the one or more processors, perform an operation comprising replacing a low quality region with part of a decorative frame around at least part of the crop.

19. The one or more computer-readable storage devices of claim 16 wherein the determining includes determining candidate patches comprising known pixels that are useable in completing the missing region, including restricting a source location for the candidate patches based upon texture features.

20. The one or more computer-readable storage devices of claim 16 wherein determining the quality of the region comprises inputting a feature vector into a trained prediction mechanism.

* * * * *